July 22, 1952     D. L. PHILLIPS     2,604,293
SHUTOFF VALVE
Filed Sept. 4, 1945
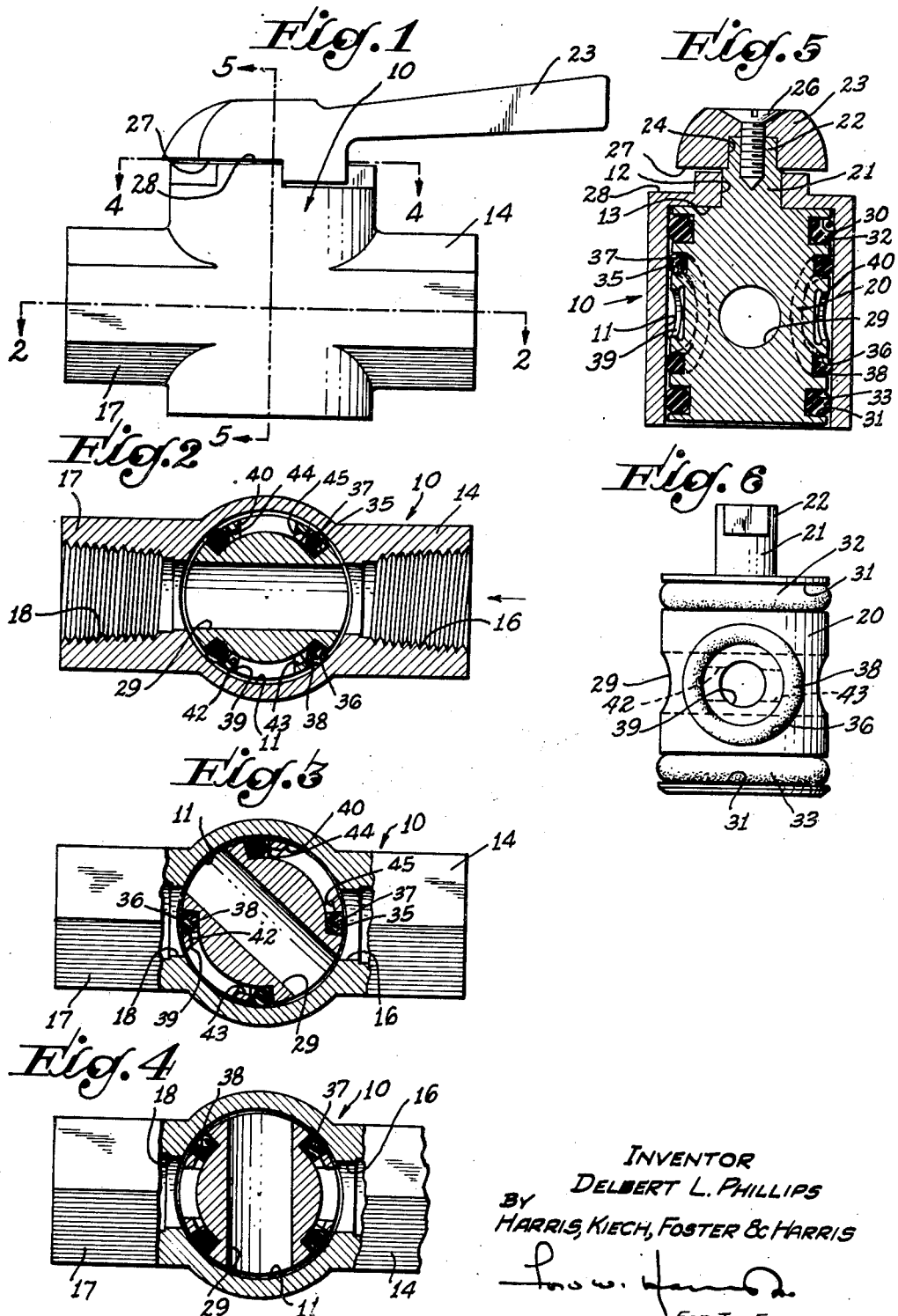
INVENTOR
DELBERT L. PHILLIPS
BY
HARRIS, KIECH, FOSTER & HARRIS
FOR THE FIRM
ATTORNEYS Patented July 22, 1952

2,604,293

UNITED STATES PATENT OFFICE 2,604,293

SHUTOFF VALVE

Delbert L. Phillips, Culver City, Calif., assignor to William R. Whittaker, William S. Whittaker, Beulah Whittaker, Robert M. Vandegrift, Roger D. Vandegrift, and Delbert L. Phillips, co-partners doing business as Wm. R. Whittaker Co., Ltd., Los Angeles, Calif.

Application September 4, 1945, Serial No. 614,318

5 Claims. (Cl. 251—103)

My invention relates to a valve and, more particularly, to a plug valve adapted to open or close fluid communication between a pair of fluid lines.

It is well known in the art to provide a plug valve including a housing having a bore and a pair of housing ports therein, and a rotatable cylindrical or tapered valve member in the bore provided with a valve port adapted to connect the housing ports when the valve member is in an open position, the valve member being rotatable to open or close such fluid connection between the housing ports. This general type of valve device is in common use in the art, and it is a primary object of the present invention to provide an improved form thereof which can be manufactured simply and economically, and easily assembled, and which is provided with sealing means of an improved type for effectively sealing the valve against leakage when subjected to relatively high fluid pressures, such as, for example, 2000 pounds per square inch.

My invention includes a plug valve of such general type in which a conventional O-ring, or doughnut packing, is preferably used to seal the valve member relative to the housing inlet port to prevent leakage when the valve member is in closed position, the valve member being provided with a suitable groove adapted to contain the O-ring so as to encircle the housing port when the valve member is in such closed position.

I have also found that where such an O-ring is used as described in the surface of a rotatable valve element which, during rotation, partially exposes the O-ring to the downstream side of the valve member during fluid flow therethrough a pressure differential across the O-ring sometimes occurs tending to force the O-ring out of its retaining groove, which, if it occurs, normally damages the O-ring and renders the valve inoperative. It is therefore the object of my invention to provide an improved construction in such a device, whereby any pressure differential on an O-ring in a groove, tending to pull the ring out of the groove is equalized so as to prevent displacement of the ring from the groove.

Other objects and advantages will be apparent from the specification and drawing, which is for the purpose of illustration only, and in which:

Fig. 1 is a side view of a valve including my invention;

Fig. 2 is a horizontal cross-sectional view taken on the line 2—2 of Fig. 1, showing the rotatable valve member in open position;

Fig. 3 is a view similar to Fig. 2, but showing the rotatable valve member in an intermediate position;

Fig. 4 is a view similar to Fig. 2, but showing the rotatable valve member in closed position;

Fig. 5 is a vertical cross-sectional view taken on the line 5—5 of Fig. 1; and

Fig. 6 is an elevational view of a rotatable valve member including my invention.

Referring to the drawing, I show a housing 10 of generally cylindrical form having a major bore 11 and a minor bore 12 axially aligned therewith and separated therefrom by an annular shoulder 13. Formed on one side of the housing 10 is a boss 14 providing an inlet housing port 16, the outer portion of which is provided with pipe threads so as to permit connection of the valve device to a suitable pipe line (not shown). Formed on the opposite side of the housing 10, and diametrically aligned with the boss 14, is a boss 17 providing an outlet housing port 18, the outer portion of which is provided with internal pipe threads to permit connection thereof to a suitable pipe line (not shown).

Disposed in the housing 10 is a rotatable cylindrical valve member 20, on the top of which, as best shown in Fig. 5, is a cylindrical extension 21, the valve member 20 being disposed in the major bore 11 so that the upper end of the valve member engages the annular shoulder 13, the extension 21 extending through the minor bore 12 and out of the housing, the top of the extension being provided with a hexagonal end 22 over which fits a handle member 23 having a hexagonal opening 24 therein which fits the hexagonal end 22 of the extension 21. The handle member 23 is secured to the hexagonal end 22 of the cylindrical extension 21 by a suitable screw 26, and the handle member 23 is provided with a lower face 27 which is spaced slightly from the top 28 of the housing 10. As will be noted, the annular shoulder 13 serves as a stop to limit inward movement of the valve member 20 relative to the housing 10, and the handle member 23 serves as a stop to limit outward movement of the valve member relative to the housing, so as to securely lock the valve member in position in the housing against substantial longitudinal movement relative thereto, but permitting rotation thereof therein.

The valve member 20 is provided with a valve port 29 therethrough which, as shown in Fig. 2, is adapted to connect the inlet and outlet housing ports 16 and 18, respectively. The valve member 20 is provided, adjacent its upper and lower ends, respectively, with annular grooves 30 and 31, which retain, respectively, annular sealing rings 32 and 33. Also formed in the periphery of the valve member 20 is a pair of circular grooves 35 and 36 which retain sealing rings 37 and 38, respectively. The sealing rings 32, 33, 37, and 38 are preferably all similar in form and construction, preferably being of the so-called "doughnut" type, sometimes known as "O-rings," well known in the art, which are formed of rubber or other resilient material, normally being circular in plan view and substantially circular in cross section. The provision of the sealing rings 37 and 38, which are substantially circular in cross-section, provides a relatively small area of engagement with the major bore 11, which is an important feature of the invention, as it reduces friction between the valve member and the bore to a minimum, and furthermore, provides a relieved space on each side of the area of engagement so that any rolling or twisting of the area of engagement does not tend to bind or wedge the sealing ring between the valve member and the bore. While the sealing rings 37 and 38 may be made triangular in cross-section, or otherwise shaped to provide such a small area of engagement, it will be apparent that square or rectangular sealing rings are wholly unsuitable for use in such a valve, as high fluid pressure applied to a square or rectangular sealing ring causes it to twist and bind between the valve member and the bore.

The sealing rings 32 and 33, when installed as shown, retain their original form, but, as will be noted, the sealing rings 37 and 38 are distorted from their normal circular form in a flat plane to conform to the circular periphery of the valve member 20, being held in this position by engagement with the wall of the major bore 11. Such distortion of the sealing rings 37 and 38 sets up internal stresses and strains therein which tend to cause them to wear unevenly upon rotation of the valve member 20 in the housing 10, and, as will be apparent, when the valve member is removed from the housing, the sealing rings will tend to return to their original flat configuration, thus springing out of their retaining grooves. As will be appreciated, this is very undesirable, and I prefer to treat the sealing rings as described hereinafter to provide the same with a permanent set to their installed configuration.

To give the sealing rings 37 and 38 a permanent set to the configuration which they occupy when installed, upon installation, as illustrated in the drawing, the complete valve device is immersed in a hot fluid for a time sufficient to permit the heat to give the rings the desired permanent set. Although the temperature and time of treatment will vary somewhat, depending upon the material of which the sealing rings are made and the size thereof, I have found that, in using neoprene sealing rings approximately 3/32 of an inch in cross-sectional diameter, immersion in hot oil at a temperature of approximately 240° F. for a period of approximately two and one-half minutes is sufficient to give the rings the permanent set desired. Upon completion of this treatment, the valve member 20 is removed from the housing 10 and the parts cleaned separately of any oil that may adhere thereto, following which the valve may again be reassembled for shipment or use. After the heat treatment as described, when the valve member 20 is removed from the housing 10, the sealing rings 37 and 38 retain their configuration conforming to the arc of the periphery of the valve member, and there is no tendency for the rings to fall out or otherwise be displaced therefrom. The heat treatment does not, of course, impair the efficiency of the seal formed by the rings between the valve member 20 and the housing 10.

As best shown in Figs. 2 and 6 of the drawing, a circular recess 39 is formed in the periphery of the valve member 20 within the circle formed by the circular groove 36, and a similar recess 40 is formed within the circular groove 35. The recess 39 is in fluid communication with the circular groove 36 through undercuts 42 and 43 which communicate with the bottom of the groove, and the recess 40 is similarly in fluid communication with the circular groove 35 through undercuts 44 and 45 which communicate with the bottom of the groove 35. The function of this construction is to provide a means for equalizing the fluid pressures on the sealing rings 37 and 38 during the operation of the device, as will be described hereinafter.

The valve device, as illustrated in Fig. 2, is in its open position, in which the valve port 29 provides fluid communication between the inlet and outlet ports 16 and 18. In this position, the sealing rings 37 and 38 perform no useful function, and the sealing rings 32 and 33 form fluid-tight seals between the valve member and the housing so as to prevent leakage thereby along the valve member. In the open position, the sealing rings 32 and 33 bear the full fluid pressure of fluid in the valve port 29. When it is desired to close the valve device, the handle member 23 is rotated so as to rotate the valve member 20 approximately 90° in a clockwise direction, as viewed in Fig. 2, to the position illustrated in Fig. 4, in which the valve port 29 is out of registry with the inlet and outlet ports 16 and 18. By such rotation of the valve member 20 to its closed position illustrated in Fig. 4, the sealing ring 37 is moved over the inlet port 16 to a position in which it encircles or surrounds the same, and the sealing ring 38 is similarly moved over the outlet port 18 to a position in which it encircles or surrounds the outlet port. In this closed position, as will be understood, the sealing rings 37 and 38 form continuous fluid-tight seals around the inlet port 16 and the outlet port 18, respectively, the seals being thus formed being quite narrow due to the preferably circular cross section of the sealing rings and the resulting relatively small area of sealing engagement but fully adequate to seal against relatively high pressures, such as, for example, 2000 pounds per square inch. Thus, when the valve device is in the closed position described, the full fluid pressure in the inlet port 16 will be carried by the sealing ring 37, and the full fluid pressure, if any, in the outlet port 18 will be carried by the sealing ring 38.

If fluid is flowing through the valve device in its open position, as illustrated in Fig. 2, when the valve member 20 is rotated to the closed position illustrated in Fig. 4, there will be a point, illustrated by Fig. 3, in which fluid is still flowing through the valve device, and the sealing ring 38 is exposed to the outlet port 18 during its passage thereover.

The valve member 20 is almost closed in such position shown in Fig. 3, and fluid flow from the valve port 29 to the outlet port 18 is substantially restricted, causing a substantial pressure drop across the valve member. Since fluid at relatively high pressure is present in the valve port 29, and since there is substantial clearance between the valve member 20 and the major bore 11, such fluid readily passes behind the sealing ring 38 into the groove 36 outside of but behind the sealing ring 38. At this point in the operation of the valve the recess 39 communicates with the outlet port 18 so that the fluid pressures on the inside and outlet port side of the sealing ring are balanced, and the excess high pressure fluid which has leaked behind but outside of the sealing ring exerts a lateral pressure on the sealing ring tending to wedge it in its groove. Without the recess 39 and the undercuts 42 and 43, such high pressure fluid behind and outside of the sealing ring 38 merely provides a pressure differential on the sealing ring tending to force it out of its groove 36 into the outlet port 18. This effect is so marked in some conditions of operation, without the recess 39 and undercuts 42 and 43, that the sealing ring 38 is forced from the groove 36 into the outlet port 18 and frequently broken or so badly distorted as to require replacement and to require the valve to be taken out of service for repair. This effect is entirely obviated in my invention by reason of the recess 39 and the undercuts 42 and 43, which, if any pressure differential exists across the sealing ring 38 tending to force it from its groove 36, it is immediately counter-balanced by the lateral fluid pressure on the sealing ring 38, so that the sealing ring remains in its retaining groove 36.

As will be noted from Figs. 2, 3, and 4, the valve member 20 is substantially smaller in diameter than the major bore 11 of the housing 10 so as to provide substantial clearance therebetween which is taken up by the sealing rings 37 and 38. Consequently, as the valve member 20 is rotated from its open position illustrated in Fig. 2 to its closed position illustrated in Fig. 4, as soon as one side of the sealing ring 38 overlaps the outlet port 18 the fluid pressure in the outlet port is communicated through the recess 39 and the undercut 42 to the under side of the sealing ring, equalizing the pressure thereon. As will be apparent, if the direction of fluid flow through the valve device is reversed, i. e., the port 18 being used as an inlet port and the port 16 being used as an outlet port, the fluid pressure on the sealing ring 37 is equalized similarly to that on the sealing ring 38 as described above. It will be apparent, of course, that if the fluid flow through the valve device is always in one direction, only one of the sealing rings 37 or 38 need be employed on the upstream side of the flow so as to seal the inlet port when the valve device is in closed position. In this condition, the invention residing in the recess 39 and the undercuts 42 and 43 may be omitted, although this construction is specifically provided for the specific condition noted above.

While I have shown and described a preferred embodiment of my invention, it is to be understood that I do not intend to be limited thereby, as substantial modifications may be made in the form thereof without departing from the spirit of my invention. Consequently, I desire to be afforded the full scope of the following claims.

I claim as my invention:

1. In a hydraulic device, the combination of: a first member having a port; a second member having a continuous groove which is adapted to surround said port, and having passage means therepast which is spaced from said groove and which is adapted to register with said port; a continuous, resilient sealing element in said groove and having a maximum width no greater than the width of said groove at its mouth, said members being relatively movable between a first position in which said passage means is out of registry with said port and in which said sealing element surrounds said port to prevent fluid flow through said passage means and said port, and a second position in which said sealing element is positioned to permit such flow and in which said passage means is only partially in registry with said port so as to throttle flow through said passage means and said port, at least a portion of said sealing element registering with said port in said second position across the entire width of said portion of said sealing element, said sealing element when in said second position having a fluid pressure differential thereacross tending to force it out of said groove into said port; and means including a vent passage communicating with the bottom of said groove and communicating with said port when said members are in said second position for preventing said sealing element from being forced into said port by said fluid pressure differential.

2. In a hydraulic device, the combination of: a first member having a first port; a second member having a continuous groove which is adapted to surround said first port, and having a second port which is adapted to register with said first port and which is spaced from said groove; a continuous, resilient sealing element in said groove, said members being relatively movable between a first position in which said sealing element surrounds said first port to prevent fluid flow between said ports and a second position in which said sealing element is positioned to permit such flow and in which said second port only partially registers with said first port so as to throttle flow through said first and second ports, at least a portion of said sealing element registering with said first port in said second position across the entire width of said portion of said sealing element, said sealing element, when in said second position, having a fluid pressure differential thereacross tending to force it out of said groove into said first port; and vent passage means communicating with the bottom of said groove and communicating with said first port when said members are in said second position so as to substantially equalize the fluid pressures acting on said sealing element and to substantially cancel said fluid pressure differential tending to force said sealing element out of said groove into said first port.

3. In a hydraulic device, the combination of: a housing having a chamber and having a port communicating with said chamber; a member in said chamber having a continuous groove in the periphery thereof, which encircles said port in said housing when said member is in a port-closing location relative to said housing, said member being movable in said chamber to a position in which at least a portion of said groove registers with said housing port for the entire width of said portion of said groove, said member having a fluid passage communicating with the bottom of said groove and registering with said port when said member is in said position, and said member having passage means therepast which is adapted to register with said port and which is only partially in registry with said port when said member is in said position so as to throttle flow through said passage means and said port; means for moving said member in said chamber; and a sealing element, formed of resilient material, disposed in said groove and adapted to engage both said member and said chamber to form a fluid-tight seal therebetween.

4. In a device of the character described, the combination of: a housing having a bore and having a housing port communicating with said bore; a cylindrical member in said bore and having a diameter less than that of said bore to provide a clearance therebetween, said member having an opening adapted to register with said housing port and being movable in said bore from a first position, in which said opening is in complete registry with said housing port, through a second position in which said opening is in partial registry with said housing port, to a third position in which said opening is out of registry with said housing port, said member having a continuous, curved groove in the periphery thereof and having a passage communicating with the bottom of said groove and extending to the periphery of said member on one side of said groove, at least a portion of said groove registering with said housing port across the entire width of said portion of said groove when said member is in said second position, and said passage communicating with said housing port when said member is in said second position, and said groove encompassing said housing port when said member is in said third position; means for moving said member from said first position to said third position; and a sealing ring member, formed of resilient material, disposed in said groove and adapted to engage both said member and said bore to form a fluid-tight seal therebetween.

5. In a device of the character described, the combination of: a housing having a bore and having a pair of housing ports each communicating with said bore; a cylindrical member in said bore and having a diameter less than that of said bore to provide a clearance therebetween, said member having an opening therethrough which is adapted to register with said housing ports and being movable in said bore from a first position, in which said opening is in complete registry with said housing ports, through a second position, in which said opening is in partial registry with said housing ports, to a third position in which said opening is out of registry with said housing ports, said member having a continuous, curved groove in the periphery thereof and having a passage communicating with the bottom of said groove and extending to the periphery of said member on one side of said groove, said passage registering with one of said housing ports when said member is in said second position, and at least a portion of said groove registering with said one housing port across the entire width of said portion of said groove when said member is in said second position, and said groove encompassing said one housing port when said member is in said third position; means for moving said member between said first position and said third position; and a sealing ring member, formed of resilient material, disposed in said groove and adapted to engage both said member and said bore to form a fluid-tight seal therebetween.

DELBERT L. PHILLIPS.

REFERENCES CITED

The following references are of record in the file of this patent:

UNITED STATES PATENTS

| Number | Name | Date |
| --- | --- | --- |
| 1,872,417 | Dalldorf | Aug. 16, 1932 |
| 1,913,198 | Geiger | June 6, 1933 |
| 2,008,772 | Robertson | July 23, 1935 |
| 2,392,319 | Harwood | Jan. 8, 1946 |
| 2,427,439 | Brown | Sept. 16, 1947 |
| 2,493,966 | Hartley | Jan. 10, 1950 |